United States Patent [19]

McKenzie et al.

[11] 4,357,744
[45] Nov. 9, 1982

[54] METHOD OF CONNECTING INSULATED GLASS FRAME

[76] Inventors: Everett R. McKenzie, Rte. 3; Thomas E. Smith, 2519 S. 6th St., both of Ironton, Ohio 45638

[21] Appl. No.: 156,755

[22] Filed: Jun. 5, 1980

[51] Int. Cl.³ .............................................. B23P 11/02
[52] U.S. Cl. ....................................... 29/451; 29/453; 29/525; 46/29; 403/295
[58] Field of Search .................. 29/453, 451, 455 R, 29/525, 445; 264/295; 403/402, 401, 295; 52/790; 46/26, 29, 31

[56] References Cited

U.S. PATENT DOCUMENTS

| | | | |
|---|---|---|---|
| 187,656 | 2/1877 | Maynadier | 264/295 X |
| 3,183,560 | 5/1965 | Brichard | 52/790 X |
| 3,274,728 | 9/1966 | Koch | 46/29 |
| 3,321,223 | 5/1967 | Snow et al. | 403/295 X |
| 3,345,791 | 10/1967 | Shinefeld | 52/790 |
| 3,438,117 | 4/1969 | Engleman | 29/453 X |
| 3,751,317 | 8/1973 | Galloway | 264/295 X |
| 3,866,380 | 2/1975 | Benson | 52/790 X |
| 3,898,728 | 8/1975 | Rousseau | 403/295 X |
| 4,109,432 | 8/1978 | Pilz | 52/788 X |
| 4,222,209 | 9/1980 | Peterson | 52/790 X |

FOREIGN PATENT DOCUMENTS

| | | | |
|---|---|---|---|
| 1192293 | 5/1970 | United Kingdom | 403/402 |
| 1507497 | 4/1978 | United Kingdom | 403/401 |
| 1522724 | 8/1978 | United Kingdom | 403/295 |

Primary Examiner—Charlie T. Moon
Attorney, Agent, or Firm—Malin & Haley

[57] ABSTRACT

A corner connector for connecting adjacent hollow intermediate frames used in the construction of insulated glass panels. The corner connector includes a two-part body having a flexible mid-portion. One end of each body portion has a retaining arm. When each retaining arm of each corner connector positioned along a longitudinal center connected to an intermediate frame it holds or secures the hollow intermediate frames together. The two hollow intermediate frames can then be moved toward each other to form a ninety degree angle therebetween. The resilient mid-portion of the body of the corner connector may be locked in place to maintain that perpendicular relationship. Therefore four intermediate frames may be positioned along the same longitudinal line during manufacturing.

3 Claims, 9 Drawing Figures

METHOD OF CONNECTING INSULATED GLASS FRAME

BACKGROUND OF THE INVENTION

The present invention relates to a connector adjacent intermediate frames used in insulated glass panels and more particularly to a corner connector which can be used to attach the adjacent intermediate frames when they are still in coplanar relation along a longitudinal center line and allows them to be moved into a rectangular shape. The connector fixes adjacent intermediate frame members to one another and is movable into a locked right angle position.

In the past there have been corner connectors utilized for connecting adjacent intermediate frames for insulated glass panels. However, these were rigid preformed connectors in a right angle configuration and required that the frame members be inserted about the connectors from a right angle position relative to one another. Then frame member connection was made in a non-movable configuration.

An example of the prior art is U.S. Pat. No. 3,183,560 in which an intermediate frame for insulated glass panels is illustrated. This reference teaches the use of metallic right-angled members, whose arms are introduced into the ends of the tubes and maintain the latter in position at ninety degrees to one another. They are secured to the ladder by means of a soldering operation which is used and carried out by successively immersing each of the corners in a molten tin solder bath so as to fill the entire space between the two tubes, as also the space between the inner walls of the tubes and the right angled member. This soldering method is quite expensive and time consuming. The present invention is a new and improved device over U.S. Pat. Nos. 3,866,380 and 4,109,432. The present invention provides a more complex flexible corner connector which simply snaps into place maintaining the adjacent intermediate frame members in a right angle configuration that can be initially inserted into the intermediate frames lying in a straight line.

SUMMARY OF THE INVENTION

According to the present invention a corner connector for connecting adjacent hollow intermediate frames used in the construction of insulated glass panels that may lie in a straight line in relationship to one another. The corner connector lying in an open position comprises a body having two body portions with a flexible mid-body portion, and two connecting portions. A connecting portion is positioned on opposite ends of the body having a V-shaped distal end portion to move into an end of the intermediate frame to retain the corner connector in the ends of the intermediate frame.

The flexible mid-body portion of the elongated body positioned adjacent mating surfaces that contain a female aperture and a male member or locking portion sized for mating with the female aperture to maintain or lock the corner connector and the attached adjacent intermediate frame members in a right angular relationship with each other. In the locked position the mating surfaces are positioned in contact with one another. In an open position the side view of the mating surfaces form a V.

The corner connector enables the intermediate frame to be produced so that the individual frames are arranged in a line in a coplanar relationship during the initial production process at which time the corner connectors in an open position are inserted between each adjacent end of the intermediate frames. The resilient mid-portion of the corner connectors are allowed to form a right angle to each connector portion. The connector is snapped or locked into place to form the rectangular intermediate frame before it is connected between two glass panels to make an insulated glass panel.

It is therefore an object of this invention to provide a non-complex corner connector having a flexible portion that is used in the manufacture of insulated glass panels.

It is another object of this invention to provide a corner connector which locsk adjacent frame members at right angles after they are formed in a straight line position.

It is another object of this invention to provide a corner connector which enables the construction of intermediate frames from members that are disposed in an end to end relationship along a common longitudinal axis and thereafter moved to a right angle position.

It is another object of this invention to be able to move the intermediate frames and connected corner connectors while they are in a straight line in relationship to one another unformally and continuously without interruption through or by the hot melt application providing for a more uniform application of hot metl material on the corner connectors and therefore provide a better insulated glass unit.

It is another object of this invention to provide a corner connector that can be used with all different lengths of intermediate frames, which different lengths would produce different sizes of insulated glass panels, without modification of equipment during the hot melt application process.

It is an additional object of this invention to provide a lineal run of intermediate frames of various lengths and/or cross-sectional areas without requiring time consuming indexing adjustment and notching equipment adjustments.

In accordance with these and other objects which will be apparent hereinafter, the instant invention will now be described with particular reference to the accompanying drawings.

DESCRIPTION OF THE PREFERRED EMBODIMENT

Figure 1:
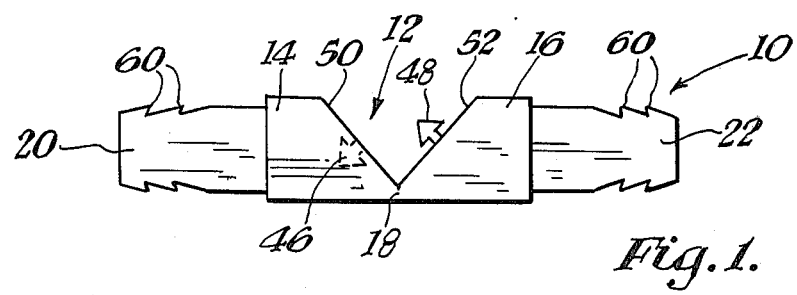
FIG. 1 is a plan view of the corner connector in an open or unfolded, unlocked position.
Figure 2:
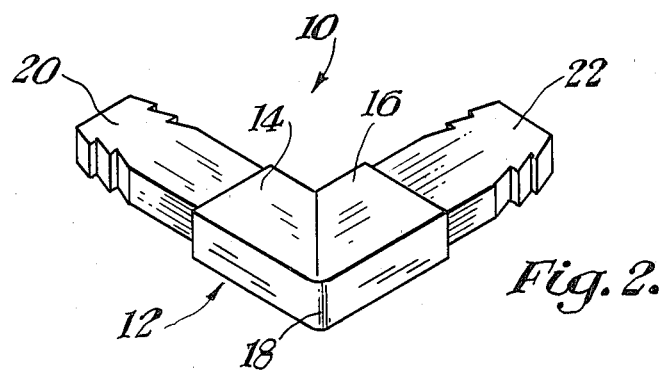
FIG. 2 is an isometric view of the corner connector shown in closed right angle configuration.
Figure 3:
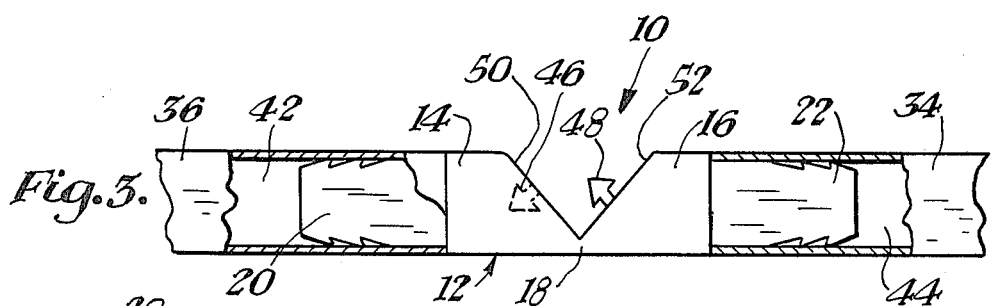
FIG. 3 is a plan view of the corner connector shown in FIG. 1 within adjacent intermediate frames partially in cross-section.
Figure 5:
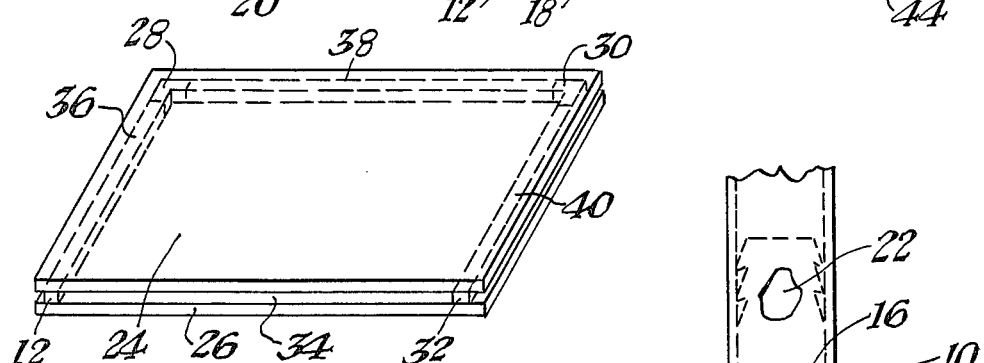
FIG. 5 is an isometric illustration of two windows with four corner connectors and four two frames therebetween.
Figure 4:
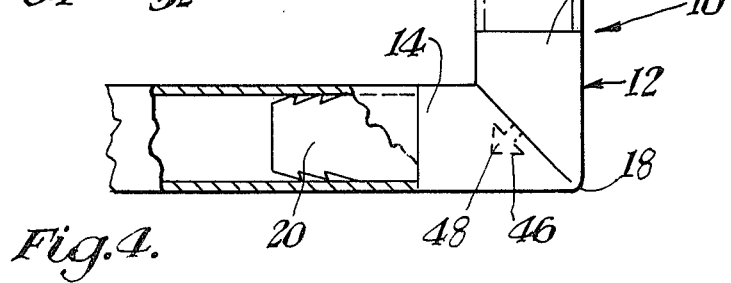
FIG. 4 is a plan view of the corner connector shown in FIG. 2 within two adjacent intermediate frame partially in cross-section.

Referring now to the drawings and particularly FIGS. 1 and 2 the corner connector is shown generally at 10. The corner connector comprises a body 12 having a first body portion 14, a second body portion 16, a flexible mid-portion 18, a first connecting portion 20 and a second connecting portion 22. In this embodiment the corner connector is made of a flexible material so that it can be bent into a right angle shape as shown in FIG. 2. The flexible mid-portion 18 allows the intermediate frames to be assembled as shown in FIG. 3 and thereafter be positioned as shown in FIG. 4 in order to maintain the intermediate frames used in the production of double glass panels or windows at right angles to each other as illustrated in FIG. 5. One glass sheet 24 is positioned over and the other glass sheet 26 is positioned under the four corner connectors 12, 28, 30, and 32 and the four intermediate frames 34, 36, 38, and 40. The glass, corner connectors and intermediate frames or frame members may be adhesively bound to one another.

Once the male connector portions 20 and 22 are connected to the female apertures 42 and 44 in intermediate frames 36 and 34 respectively as shown in FIG. 3 the corner connectors may be foled and locked in position as shown in FIG. 4.

The first body portion 14 may have female connector portion 46 and the second body portion 16 may have male connecting portion 48 to retain the corner connector in a right angle configuration within the respective walls 50 and 52 positioned in face to face relationship. The male member 48 may be arrow shaped and female opening 46 may be a mating opening that allows male member 48 to snap into and lock in female opening 46.

When each connecting portion 20 and 22 are inserted into the respective ends of two adjacent hollow or female portions 42 and 44 of the intermediate frames 36 and 34 the respective ends 60 of the connecting portions apply an outwardly directed force against the inner walls of the intermediate frames to retain the first connecting portion 20 and second connecting portion 22 in the respective frame or member. The intermediate frames 36 and 34 are then rotated toward each other in the same plane so they reach at right angles to one another as shown in FIG. 4. The flexible mid-portion 18 of the corner connector 10 overlaps in such a manner that the connector is in alignment with the female aperture. The body portions are then snapped together holding the corner connector and the adjacent intermediate frames at a right angle to each other.

The intermediate frames and corner connectors form a rectangle or square with a flat top and bottom to provide a sealed insulated glass structure as shown in FIG. 5.

Figure 6:
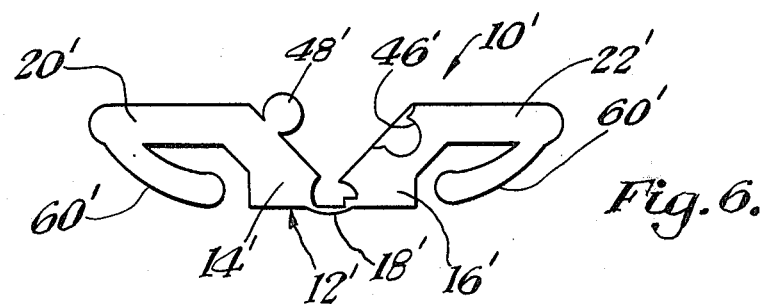
FIG. 6 is a plan view of another embodiment of a corner connector.
Figure 7:
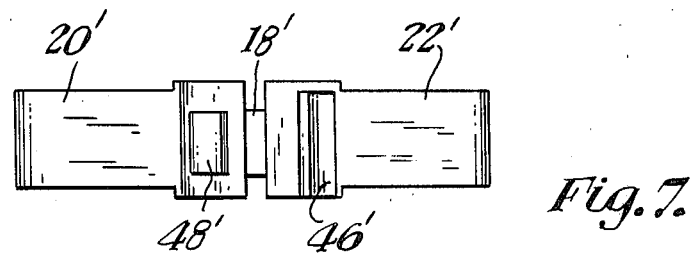
FIG. 7 is a side view of the corner connector shown in FIG. 6.

Referring now to FIGS. 6 and 7 another embodiment of the corner connector is shown generally by numeral 10'. The corner connector comprises a body 12' having a first body portion 14', a second body portion 16', a flexible mid-portion 18', a first connecting portion 20' and a second connecting portion 22'. In this embodiment the corner connector is made of a flexible material so that it can be bent into a right angle shape as shown in FIG. 2. The flexible mid-portion 18' allows the intermediate frames to be assembled as shown in FIG. 3 and thereafter be positioned as shown in FIG. 4 in order to maintain the intermediate frames used in the production of insulated glass panels or windows at right angles to each other as illustrated in FIG. 5. When the connecting portions 20' and 22' are moved into the square or rectangular opening of frame members the resilient fingers 60° hold them in a fixed relation with the adjacent frame.

Figure 8:
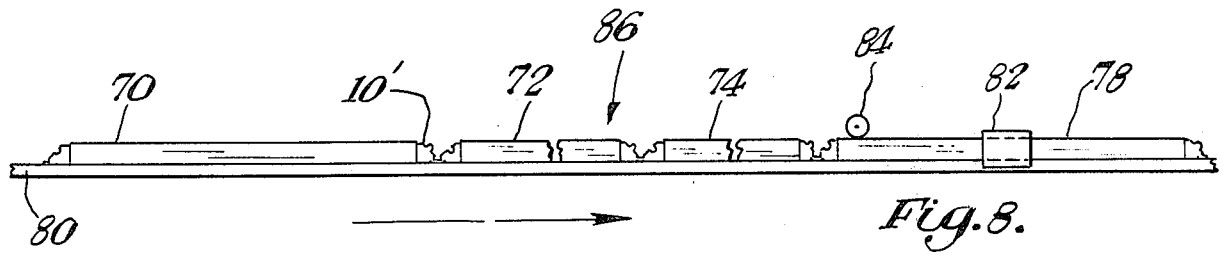
FIG. 8 is an illustration of the frames and corner connectors moving in a straight line through a hot melt applicator.

Referring now to FIG. 8, the corner connectors 10' allow four frames 70, 72, 74, and 76 to move in a straight line on a conveyor 80. The conveyor 80 moves the frames and corner connectors through a hot melt applicator 82. The hot melt applicator places hot melt plastic material uniformly on 3 sides of the four frames and four corner connectors that are moved as a unit through the hot melt applicator. A hold down roller may be used as shown. The three corner connectors may be as shown in FIG. 6 in position in the frames. The fourth corner connector may be broken at 18' in FIG. 6 so that half is at the lead end of the total four frame four corner connector unit shown by numeral 86 half the corner connector is at the tail end of the unit 86. The ball type connector 48' may be snapped in receiver 46' after the unit passes through applicator 82 to form a square or rectangle.

Figure 9:
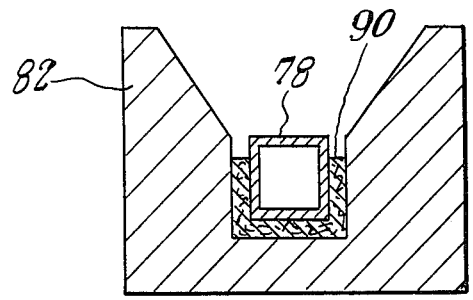
FIG. 9 is a cross-sectional front view of the hot melt applicator.

The hot melt applicator in FIG. 9 allows frame 78 to pass through the applicator 82 to obtain an even application of the hot melt 90 on three sides of the frame and corners. The hot melt device may be adustable for size variations.

The use of the present invention allows the manufacturer to quickly change the length of frame member and/or cross-sectional area of frame members for a production run of various size frames. This is accomplished only by changing the material size and the corner connectors described above. Therefore the present invention eliminates time consuming indexing adjustments required in prior methods.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method of constructing between two glass panels an insulating space by using a first corner flexible connector with a notch having a locking device, second corner flexible connector with a notch having a locking device, third corner flexible connector with a notch having a locking device, and fourth corner flexible connector with a notch having a locking device in conjunction with a first tubular member, second tubular member, third tubular member, and a fourth tubular member in end to end relation along the same longitudinal line, comprising:

functionally inserting said first corner connector into and between the adjacent ends of said first member and said second member lying along said line;
   frictionally inserting said second corner connector into and between the adjacent and other end of said second member and the adjacent end of said third member;
   frictionally inserting said third corner connector into and between the adjacent and other end of said third member and the adjacent end of said fourth member;

moving said first member and said second member into a generally right angle relationship with each other;

locking said first corner connector to maintain said generally right angle relationship between said first member and said second member;

moving said second member and said third member into a generally right angle relationship with each other;

locking said second corner connector to maintain said generally right angle relationship between said second member and said third member;

moving said third member and said fourth member into a generally right angle relationship with each other;

locking said third corner connector to maintain said generally right angle relationship between said third member and said fourth member;

frictionally inserting said fourth corner connector into and between the other ends of said first member and the adjacent said fourth member;

locking said fourth corner connector to maintain said generally right angle relationship between said fourth member and said first member, for use between glass panels.

2. A method as set forth in claim 1 wherein:

said locking is self locking of two portions of said first corner connector, said second corner connector, said third corner connector, and said fourth corner connector.

3. A method of constructing a four sided structure with ninety degree angles therebetween by using a first corner flexible connector with a notch having locking device, second corner flexible connector with a notch having a locking device, third corner flexible connector with a notch having a locking device, and fourth corner flexible connector with a notch having a locking device in conjunction with a first tubular member, second tubular member, third tubular member, and a fourth tubular member in end to end relation along the same longitudinal line, comprising:

frictionally inserting said first corner connector into and between the adjacent ends of said first member and said second member lying along said line;

frictionally inserting said second corner connector into and between the adjacent and other end of said second member and the adjacent end of said third member; and frictionally inserting said third corner connector into and between the adjacent and other end of said third member and the adjacent end of said fourth member placing said first corner connector, said second corner connector and, said third corner connector, and said first member, said second member, said third member, and said fourth member in a straigh line;

moving said first member and said second member into a generally right angle relationship with each other to automatically lock said first corner connector to maintain said generally right angle relationship between said first member and said second member;

moving said second member and said third member into a generally right angle relationship with each other to automatically lock said second corner connector to maintain said generally right angle relationship between said second member and said third member;

moving said third member and said fourth member into a generally right angle relationship with each other to automatically lock said third corner connector to maintain said generally right angle relationship between said third member and said fourth member;

frictionally inserting said fourth corner connector into and between the other ends of said first member and the adjacent said fourth member;

locking said fourth corner connector to maintain said generally right angle relationship between said fourth member and said first member, for forming said four sided structure.

* * * * *